Feb. 23, 1937. M. L. HANCOCK 2,071,742
BRAKE CYLINDER PROTECTOR
Filed Dec. 16, 1933
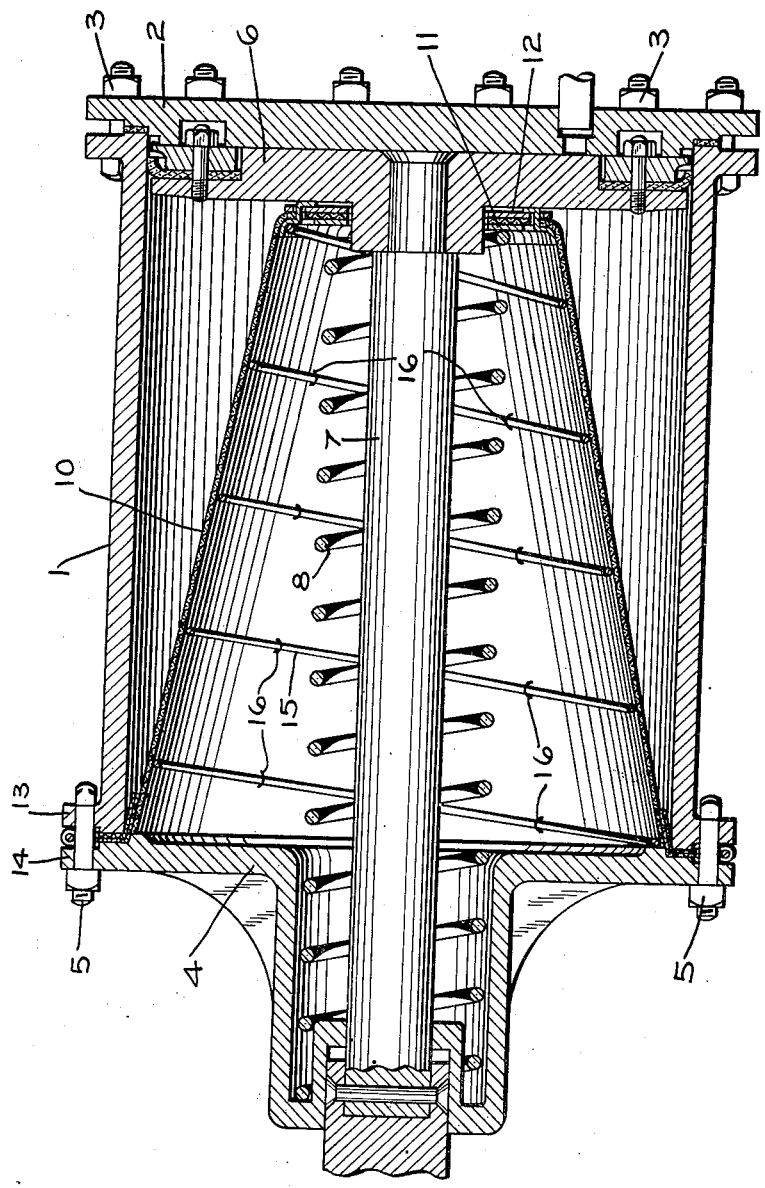
INVENTOR.
MILTON L. HANCOCK
By *Wm. M. Cady*
ATTORNEY.

Patented Feb. 23, 1937

2,071,742

UNITED STATES PATENT OFFICE 2,071,742

BRAKE CYLINDER PROTECTOR

Milton L. Hancock, East McKeesport, Pa., assignor to The Westinghouse Air Brake Company, Wilmerding, Pa., a corporation of Pennsylvania Application December 16, 1933, Serial No. 702,770

9 Claims. (Cl. 303—1)

This invention relates to brake cylinders such as employed in connection with the fluid pressure brake system used on railway cars.

When the piston in the usual brake cylinder is moved from the application position to the release position by the release spring in the brake cylinder, there is a flow of air to the non-pressure side of the piston around the loosely fitting piston rod, and this inflow of air tends to carry into the brake cylinder foreign matter such as moisture and dirt. In order to prevent this foreign matter from coming into contact with the wall of the cylinder and thereby causing corrosion and abrasion of said wall and the piston packing, it has heretofore been proposed to provide a collapsible filter bag in the brake cylinder to prevent the passage of foreign matter to the wall of the brake cylinder, this bag being, however, pervious to air so as to permit normal breathing action of the brake cylinder in the movement of the brake cylinder piston to application and release positions.

The filter bag heretofore proposed surrounded the piston rod and release spring in the brake cylinder, one end of the bag being secured to the back or non-pressure side of the piston, while the other end was clamped between the non-pressure head and the body portion of the cylinder.

In the movement of the brake cylinder piston to application position, this filter bag collapses into irregular folds and there is a possibility that, due to sagging of the bag towards the brake cylinder piston release spring or for other reasons, one or more of these folds may engage or get between the coils of the brake cylinder piston release spring and thus become chafed or pinched, in which case, holes are liable to develop in the bag which would defeat the purpose of the bag.

The principal object of the invention is to provide means for preventing the collapsible filter bag in a brake cylinder from ever engaging the brake cylinder piston release spring, so as to obviate the above difficulty.

In the accompanying drawing, the single figure is a sectional view of a brake cylinder provided with a collapsible filter bag embodying the invention.

As shown in the drawing, the brake cylinder is of the usual construction comprising a body portion 1, a pressure head 2 secured to one end of the body portion 1 by bolts 3, and a non-pressure head 4 secured to the other end of the body portion 1 by bolts 5. The usual piston 6 is slidably mounted in the body portion 1 and is provided with a piston rod 7 which extends out through an opening in the non-pressure head 4. The piston 6 is acted upon by the usual release spring 8 which tends to urge said piston to the release position.

When the brake cylinder piston 6 moves toward release position, air from the atmosphere enters the piston chamber through the non-pressure head around the loosely fitting piston rod 7, carrying with it foreign matter such as moisture and cinders or other dirt. To prevent this foreign matter from passing to the interior wall of the brake cylinder body 1, a conical shaped, collapsible filter bag 10 is provided around the piston rod 7 and release spring 8. The smaller end of this filter bag is clamped between two metal plates 11 and 12, and the release spring 8 acts on the plate 11 to press the plate 12 against the back side of the piston 6 to prevent leakage of foreign matter from inside of the filter bag to the outside and thereby to the wall of the cylinder. The larger end of the bag is clamped between annular flanges 13 and 14 provided on the brake cylinder body 1 and non-pressure head 4, respectively.

When the brake cylinder piston 6 is moved towards application position, that is, towards the left hand, the filter bag 10 collapses or folds up, and in order to prevent said bag from folding or sagging onto the release spring 8 and thereby possibly becoming damaged, a supporting member 15 is provided to hold the side wall of said bag away from the release spring 8, when said bag is collapsed.

The supporting member 15 is preferably in the form of a light conical spring having widely separated coils and substantially conforming in diameter to that of the filter bag 10. This support member is preferably disposed within the filter bag 10 in engagement with the inner wall thereof. One end of the support member 15 engages the clamping plate 11 which is under the inner end of the release spring 8, while the other end engages the inner wall of the non-pressure head 4. At spaced intervals along the coils of the support member 15, such as every ninety degrees, said member is secured to the inside wall of the filter bag 10 by loops of thread 16, which loops pass through the wall of the filter bag and around the coil of the support member.

It will be evident that as the bag 10 is collapsed or folded upon movement of the brake cylinder piston 6 towards application position, the support member 15 will prevent sagging or folding of the filter bag 10 onto the release spring 8 and will thereby prevent said bag from becoming damaged by said release spring, and since the coils of the support member 15 are widely separated one from the other, the support member itself will not cause damage to the filter bag.

While the support member 15 is made of spring wire or any other such material which is resilient and has strength to support the filter bag 10 as required, it is not intended that this support member shall exert any appreciable pressure against the brake cylinder piston 6 to interfere in any way with the normal movement of said piston.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination in a brake cylinder, having a non-pressure head, of a piston slidably mounted in said brake cylinder, a release spring interposed between said non-pressure head and piston, a collapsible filter element surrounding said spring and interposed between said non-pressure head and piston and adapted to be collapsed upon movement of said piston, and a support member interposed between said non-pressure head and piston and having convolutions, and means securing said filter element to said convolutions for supporting said filter element upon collapse thereof.

2. The combination in a brake cylinder, having a non-pressure head, of a piston slidably mounted in said brake cylinder, a release spring interposed between said non-pressure head and piston, a conical shaped, collapsible filter element surrounding said spring and interposed between said non-pressure head and piston and adapted to be collapsed upon movement of said piston, and a light conical spring secured to the side wall of said filter element for supporting the side wall of said filter element upon collapse thereof.

3. The combination in a brake cylinder, having a non-pressure head, of a piston slidably mounted in said brake cylinder, a release spring interposed between said non-pressure head and piston, a conical shaped, collapsible filter element surrounding said spring and interposed between said non-pressure head and piston and adapted to be collapsed upon movement of said piston, and a light conical spring interposed between said non-pressure head and piston within said filter element and engaging the inside wall of said filter element.

4. The combination in a brake cylinder, having a non-pressure head, of a piston slidably mounted in said brake cylinder, a release spring interposed between said non-pressure head and piston, a conical shaped, collapsible filter element surrounding said spring and interposed between said non-pressure head and piston and adapted to be collapsed upon movement of said piston, a light conical spring interposed between said non-pressure head and piston and engaging the wall of said filter element, and means securing said filter element to said spring at spaced intervals along the convolutions of said spring.

5. The combination in a brake cylinder, having a non-pressure head, of a piston slidably mounted in said brake cylinder, a release spring interposed between said non-pressure head and piston, a normally straight sided, collapsible filter element surrounding said spring and interposed between said non-pressure head and piston and adapted to be collapsed upon movement of said piston, and means for holding said filter element out of engagement with said spring upon collapse of said filter element.

6. The combination in a brake cylinder, having a non-pressure head, of a piston slidably mounted in said brake cylinder, a release spring interposed between said non-pressure head and piston, a normally straight sided, collapsible filter element surrounding said spring and interposed between said non-pressure head and piston and adapted to be collapsed upon movement of said piston, and means interposed between said filter element and said spring for preventing said element from engaging said spring upon collapse of said element.

7. The combination in a brake cylinder, having a non-pressure head, of a piston slidably mounted in said brake cylinder, a release spring interposed between said non-pressure head and piston, a collapsible filter element surrounding said spring and interposed between said non-pressure head and piston and adapted to be collapsed upon movement of said piston, and means carried by said piston and non-pressure head adapted to prevent collapse of said filter element into engagement with said spring.

8. The combination in a brake cylinder, having a non-pressure head, of a piston slidably mounted in said brake cylinder, a release spring interposed between said non-pressure head and piston, a normally straight sided, collapsible filter element surrounding said spring and interposed between said non-pressure head and piston and adapted to be collapsed upon movement of said piston, and means carrying the side wall of said filter element for holding said filter element out of engagement with said spring upon collapse of said filter element.

9. The combination in a brake cylinder, having a non-pressure head, of a piston slidably mounted in said brake cylinder, a release spring interposed between said non-pressure head and piston, a collapsible filter element surrounding said spring and interposed between said non-pressure head and piston and adapted to be collapsed upon movement of said piston, and a compressible support member carrying said filter element for holding said filter element out of engagement with said spring upon collapse of said filter element.

MILTON L. HANCOCK.